United States Patent [19]

Buchanan

[11] Patent Number: 4,625,447
[45] Date of Patent: Dec. 2, 1986

[54] SOLAR POWERED FISHING LURE
[75] Inventor: Beverly J. Buchanan, Lakewood, Calif.
[73] Assignee: Sevenstrand Tackle Corporation, Huntington Beach, Calif.
[21] Appl. No.: 714,379
[22] Filed: Mar. 21, 1985
[51] Int. Cl.4 .................. A01K 85/01; A01K 79/02
[52] U.S. Cl. ........................ 43/17.1; 43/42; 43/42.36
[58] Field of Search ............ 43/17.1, 17.5, 42.06, 43/42, 17, 42.36

[56] References Cited

U.S. PATENT DOCUMENTS

| 2,112,901 | 4/1938 | Anderson | 43/42.47 |
| 2,152,275 | 3/1939 | Parkins | 43/42.39 |
| 2,757,475 | 8/1956 | Pankove | 43/17.1 |
| 2,766,544 | 10/1956 | Silverthorne | 43/42.39 |
| 2,784,399 | 3/1957 | Smith | 43/17.1 |
| 2,829,462 | 4/1958 | Stokes | 43/42.36 |
| 2,932,110 | 4/1960 | Kilpinen et al. | 43/17.1 |
| 3,083,491 | 4/1963 | Meysan et al. | 43/17.1 |
| 3,310,902 | 3/1967 | Godby | 43/17.1 |
| 3,416,254 | 12/1968 | Bornzin | 43/17.1 |
| 3,535,814 | 10/1970 | O'Brien | 43/42.06 |
| 4,163,337 | 8/1979 | Kress | 43/42.25 |

Primary Examiner—Gene P. Crosby
Attorney, Agent, or Firm—William W. Haefliger

[57] ABSTRACT

A solar powered fishing lure has a lure body adapted to be carried on a fishing line proximate a hook, to be pulled in the water. A solar cell is located on the body to receive sunlight transmitted in the water and develop electrical power, and circuitry is carried by the body and receives power from said cell. An output is produced which tends to attract fish to the lure.

12 Claims, 5 Drawing Figures

U.S. Patent  Dec. 2, 1986  4,625,447
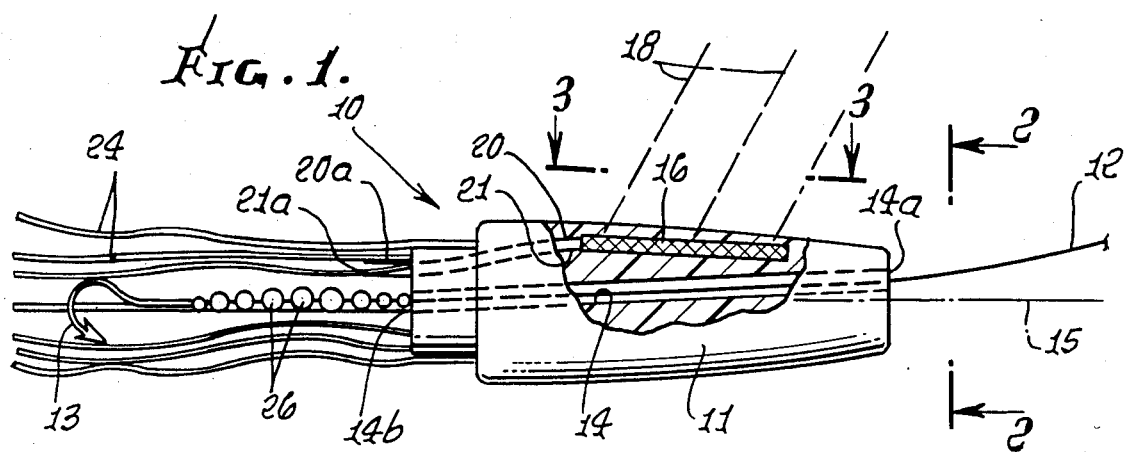
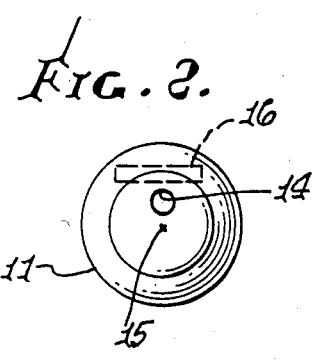
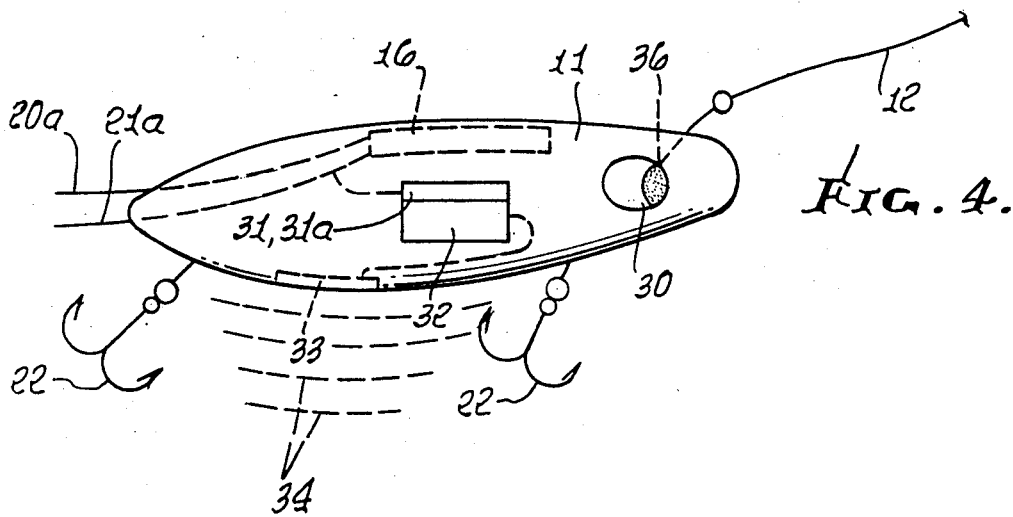
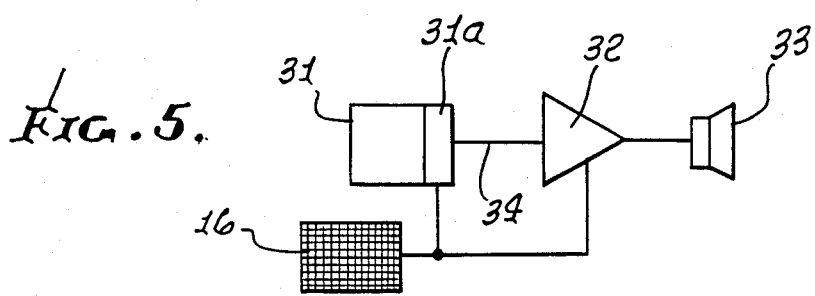

SOLAR POWERED FISHING LURE

BACKGROUND OF THE INVENTION

This invention relates generally to fishing lures, and more particularly to a lure embodying a solar cell and leads to attract fish.

Prior fishing lures are exemplified by the following patents: U.S. Pat. No. 2,784,399 to Smith, Mar. 5, 1957; U.S. Pat. No. 2,932,110 to Kilpinen, Apr. 12, 1960; U.S. Pat. No. 3,310,902 to Godby, Mar. 28, 1967; U.S. Pat. No. 3,416,254 to Bornzin, Dec. 17, 1968.

None of such patents provide or suggest the unusually advantageous features of construction and modes of operation of the fish attracting lure as disclosed herein; and there is a need for such an improved lure in order to promote more successful fishing.

SUMMARY OF THE INVENTION

It is a major object of the invention to provide an improved lure meeting the above need. Basically, the improved lure comprises:

(a) a lure body adapted to be carried on a fishing line proximate a hook, to be pulled in the water, (b) a solar cell on the body to receive sunlight transmitted in the water and develop electrical power, and means carried by the body and receiving power from said cell to provide an output which tends to attract fish to the lure.

Such means may include at least one electrical lead exposed to the water proximate the hook, and operatively connected to the cell to receive voltage application, transmitted to the water proximate the hook.

Further, as will appear, two such leads may be provided to project at the rear of the lure body to apply cell generated voltage to the water proximate the hook; means is provided on the body to cause it to cooperate with relatively flowing water thereby to keep the solar cell facing generally upwardly; and such means may include an eccentric connection of the line to the lure body, and the cell may be molded to the lure body to face upwardly at the top side of the body.

A further feature of the invention is the provision of circuitry powered by the solar cell to produce acoustical waves emanating into the water and of a character to attract fish.

These and other objects and advantages of the invention, as well as the details of an illustrative embodiment, will be more fully understood from the following specification and drawings, in which:

DRAWING DESCRIPTION

FIG. 1 is a side elevation showing a fishing lure incorporating the invention;

FIG. 2 is a vertical section taken on lines 2—2 of FIG. 1;

FIG. 3 is a top plan view of the FIG. 1 lure;

FIG. 4 is a fragmentary side elevation, showing the head of a modified lure incorporating the invention;

FIG. 5 is a circuit block diagram.

DETAILED DESCRIPTION

Referring first to FIGS. 1-3, a fishing lure 10 includes a body 11 adapted to be carried on a fishing line 12 proximate hook 13, to be pulled in the water. The body is elongated and may consist of molded or cast synthetic resin (PVC or polyester). Extending lengthwise through the body is a narrow passage 14 through which the line passes, and along which the lure body may slide, in response to water flow forces exerted on the body. Passage 14 opens at the front of the body at location 14a, and also at the rear of the body at location 14b. The body central axis appears at 15, and it will be seen that 14a is angled upwardly from axis 15, and that point 14b is either at the axis 15 or closer to the axis than point 14a. This eccentric operating connection tends to keep the body so oriented that solar cell 16 remains facing upwardly, as the body is pulled through the water by line 12.

A solar cell 16 is located at the upper side of the body 11, is generally flat, and faces upwardly, toward impinging solar rays indicated at 18. Such rays penetrate into the uppermost layers of water, through which the lure travels, i.e. is pulled by line 12. The cell may be molded into the body 11, as shown, and its output leads 20 and 21 extend within the body to project freely at the rear end of the lure body, as indicated at 20a and 21a. The low voltages (0.5 to 5 volts) generated by the cell are therefore applied to the water near the hook 13 carried by the line, to attract fish. The hook is also proximate the end of the body, and may be somewhat concealed by multiple flexible plastic strands 24. The latter typically extend rearwardly from the body 11, and may be formed as described in U.S. Pat. No. 4,335,495. Note beads 26 on the line engaging the rear of the lure to space the hook from the lure body.

In FIG. 4, the construction is the same as described above, except that passage 14 is omitted, and line 12 extends outside body 11, being attached to the upper side of the body (as to connection 36) at or near one artificial eye 30. Such an eccentric operative connection of the line to the lure body tend to maintain the cell 16 facing upwardly. The hooks 22 are here shown as attached to the rear of the body 11, and to its underside. Leads or terminals 20a and 21a remain the same.

FIG. 4 also shows the provision of circuitry, as at 31-33, to produce acoustical waves of a character, when transmitted into the water, as at 34, to attract fish. Such circuitry is shown in FIG. 5 to include a storage component 31, such as a read only memory (ROM) to store a predetermined pattern of digital bits read out in sequence, a converter 31a, such as a digital to analog converter, electrically connected to device 31, to receive and convert the bits to analog signals on line 34, an amplifier 32 to receive and amplify the analog signals, and a speaker 33 to convert the signals into digital waves. The latter are of the type large fish are attracted to, i.e. simulate those produced by small fish, as can be recorded and stored as bits in ROM 31. A lure may include components 31-33 with or without leads 20a and 21a. Cell 16 continuously powers the circuitry including components 31a and 32.

I claim:

1. A solar powered fishing lure, comprising (a) a lure body carried on a fishing line proximate a hook, to be pulled in the water, (b) a solar cell on the body and proximate one side thereof to receive sunlight transmitted in the water and develop electrical power, and means carried by the body and receiving power from said cell to provide an output which tends to attract fish to the lure, (c) and means on the lure to cause the lure to cooperate with water flowing relatively past the lure to cause the front of the line to be elevated relative to the rear of the lure, and the cell to face upwardly.

2. The lure of claim 1 wherein said means to cause the cell to face upwardly includes an eccentric opertive connection between the lead and lure, the cell contained within the body outer surface periphery which is smooth.

3. The lure of claim 1 wherein said means to cause the cell to face upwardly includes an eccentric passage through the body, the line extending in said passage.

4. The lure of claim 1 wherein said means to cause the cell to face upwardly includes a connection between the line and lure, offset from a central axis defined by the lure body.

5. The lure of claim 1 wherein said means to provide an output includes electrical circuitry to produce acoustical waves emanating into the water and of a character to attract fish.

6. The lure of claim 3 wherein said eccentric passage extends forwardly and upwardly at an angle relative to a forward axis defined by the lure body.

7. The lure of claim 5 wherein said circuitry includes a storage component that stores a predetermined pattern of digital bits, a converter electrically connected to said storage component to receive and convert said bits into analog signals, an amplifier to receive and amplify said signals, and a speaker to receive the amplified signals and convert them into said acoustical waves.

8. A solar powered fishing lure, comprising
 (a) a lure body adapted to be carried on a fishing line proximate a hook, to be pulled in the water,
 (b) a solar cell on the body to receive sunlight transmitted in the water and develop electrical power, and means carried by the body and receiving power from said cell to provide an output which tends to attract fish to the lure,
 (c) said means including at least one electrical lead exposed to the water proximate the hook, and operatively connected to the cell to receive voltage application, transmitted to the water proximate the hook.

9. The lure of claim 8 in which there are two of said leads exposed to the water and connected to the cell, to receive different voltage levels.

10. The lure of claim 9 wherein the leads terminate in the water, at the rear end of the lure body, which is forwardly elongated.

11. The lure of claim 10 including flexible strands attached to said body and extending rearwardly to conceal said terminated leads and said hook.

12. The lure of claim 8 wherein said means also includes electrical circuitry to produce acoustical waves emanating into the water and of a character to attract fish.

* * * * *